April 16, 1968  H. T. YOUNG  3,377,783
FILTER COLLECTOR
Filed Aug. 30, 1965  3 Sheets-Sheet 3

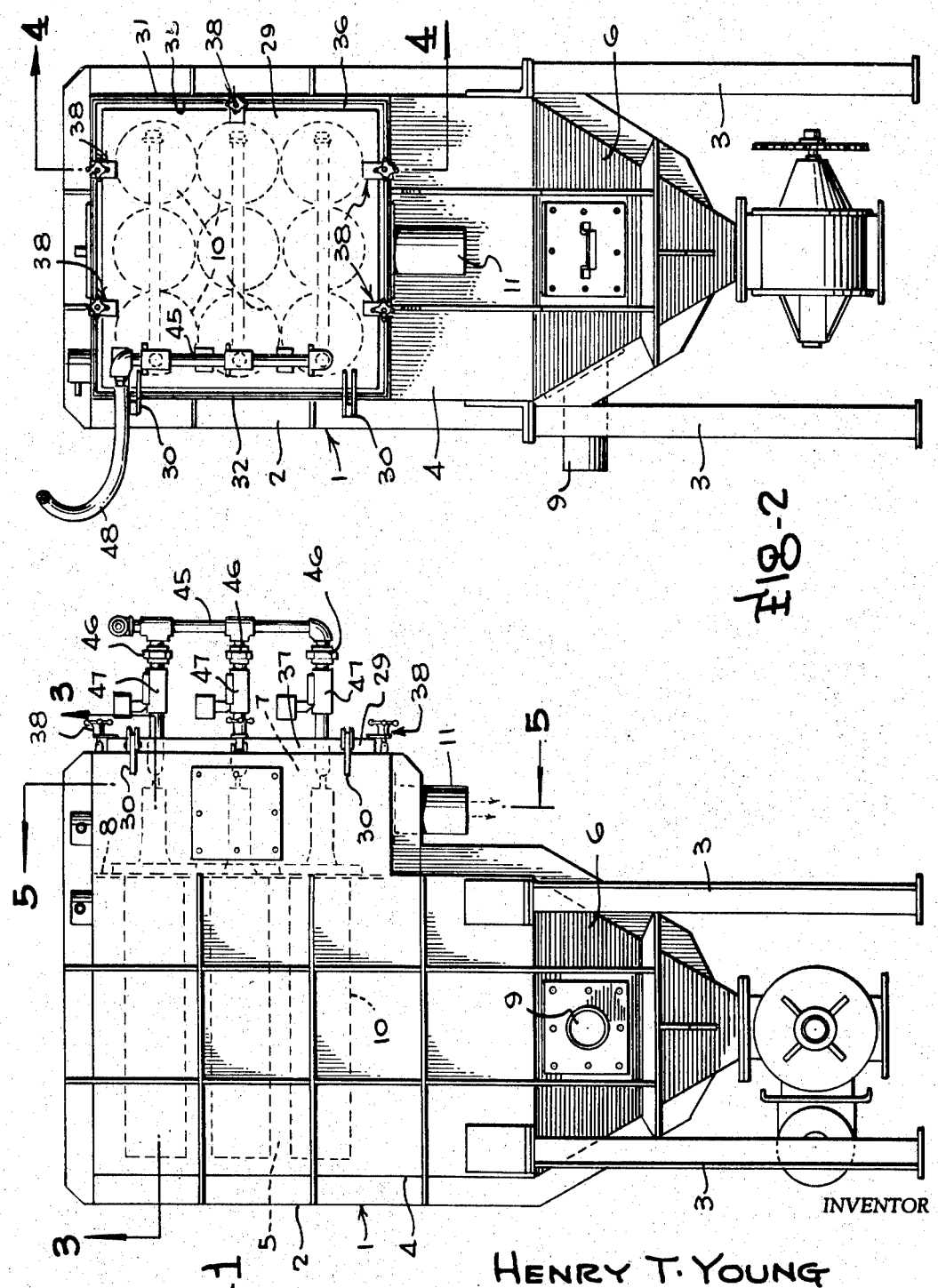

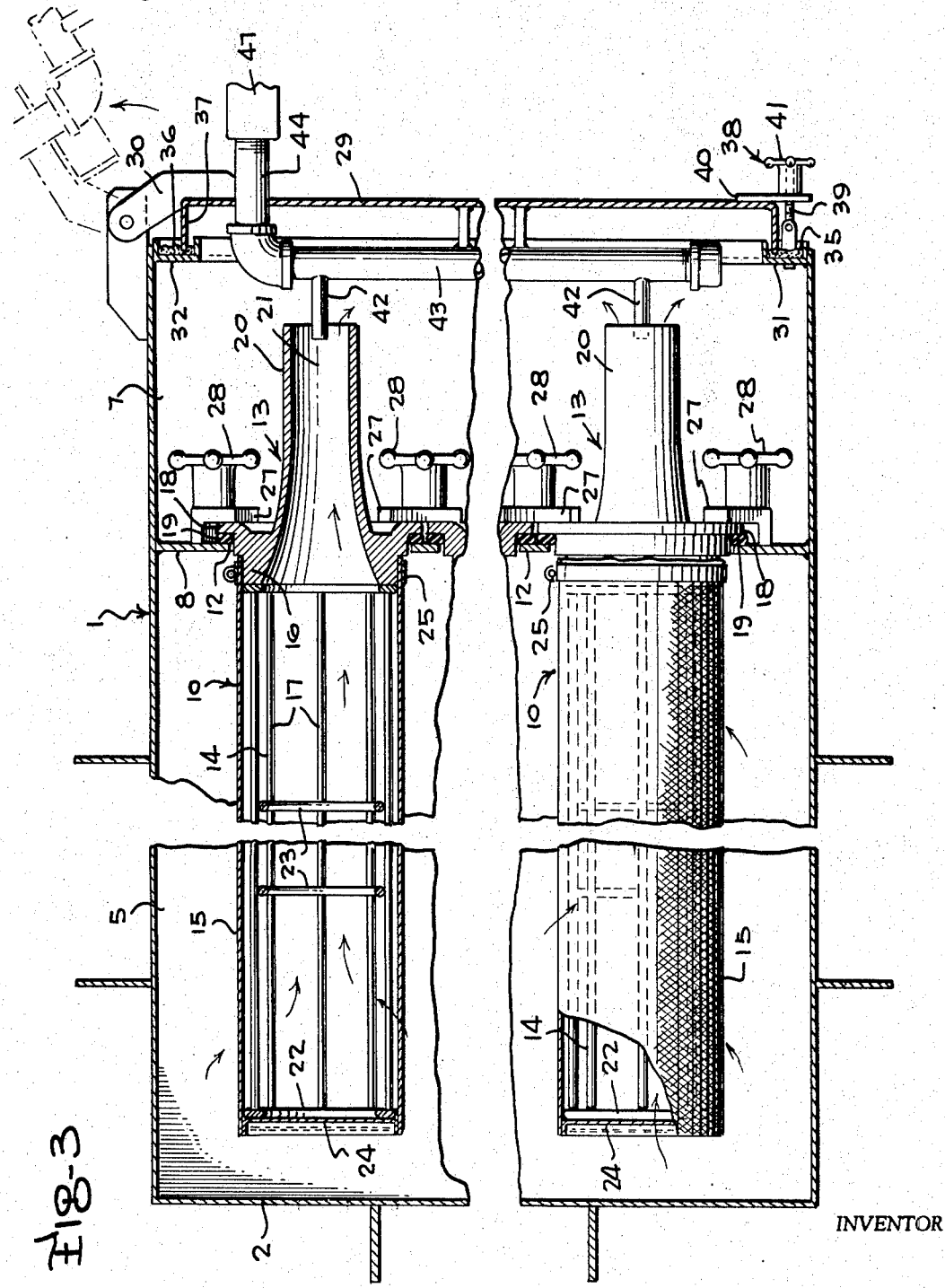

United States Patent Office 3,377,783
Patented Apr. 16, 1968

3,377,783
FILTER COLLECTOR
Henry T. Young, R.D. 2, Muncy, Pa. 17756
Filed Aug. 30, 1965, Ser. No. 483,543
3 Claims. (Cl. 55—302)

ABSTRACT OF THE DISCLOSURE

A filter chamber having removable tubular filter elements contained within the chamber and an access door providing entry to the chamber to enable removal of the filters with a plurality of nozzles mounted on a manifold fixedly attached to the door and connected to a source of compressed air so that opening of the door moves the manifold away from the filters to enable easy access thereto.

Filter collectors of this general type have been in use for some time. During normal operation, it is necessary to remove the filter elements from time to time for inspection, or replacement of the filter sock where a cage-type filter is used. In many instances, the back flow through the filters is caused by a jet arranged with its tip within, or closely adjacent, the filter outlet. This, coupled with the fact that the filters are quite long, has made the removal of the filter tubes a major undertaking. One prior suggestion for solution of the problem was to remove the tubes in an axial direction away from the blow back jet, through the outside wall of the filter chamber. This makes removal easy, but the tubes must project through the filter chamber outer wall at one end and the plenum chamber at the other. Therefore, problems of double sealing are involved.

The general object of the present invntion is to provide a filter collector having improved means for mounting the filter tubes and for removal of the tubes from the apparatus.

A more specific object of the invention is to provide a collector as described having the filters extending in horizontal position and mounted in cantilever fashion, requiring but a single seal.

Another object of the invention is to provide a collector in which a filter tube sheet forms one side of the plenum chamber and the opposed side forms a door on which the blow back mechanism is mounted, so that the door can be opened and the blow back apparatus will move out of the path of the filter, permitting easy removal of the filter.

Other objects of the invention will become apparent from the following description of one practical embodiment thereof, when taken in conjunction with the drawings which accompany, and form part of, this specification.

In the drawings:

FIGURE 1 is a side view of the improved filter collector;

FIGURE 2 is a front view of the structure shown in FIGURE 1;

FIGURE 3 is a partial horizontal section through the filter and plenum chambers, shown on an enlarged scale and taken substantially on the line 3—3 of FIGURE 1;

Figure 4:
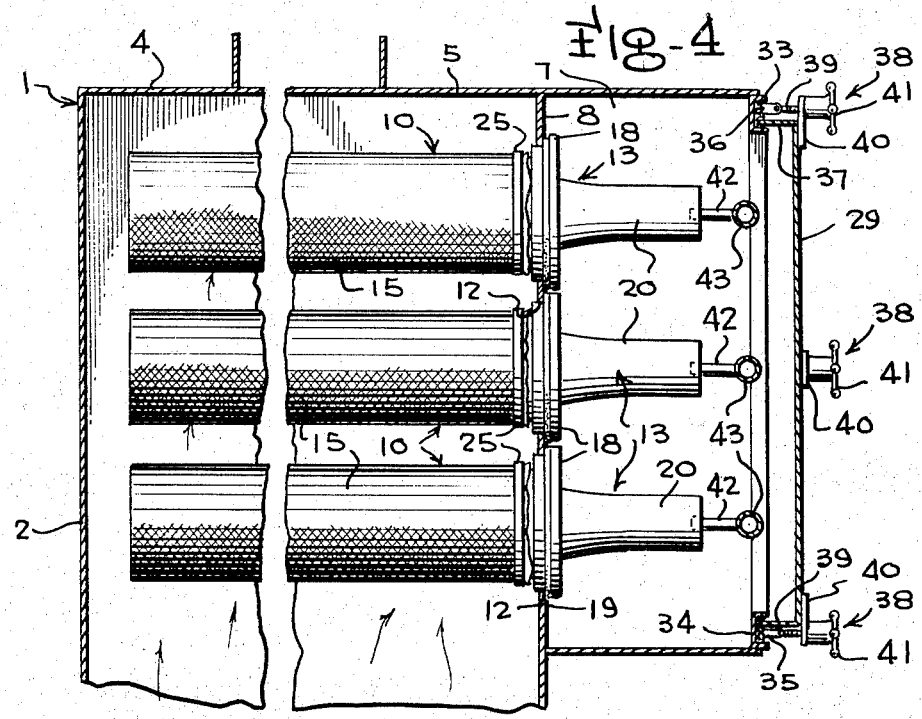
FIGURE 4 is a vertical section through the same structure taken on the line 4—4 of FIGURE 2.
Figure 5:
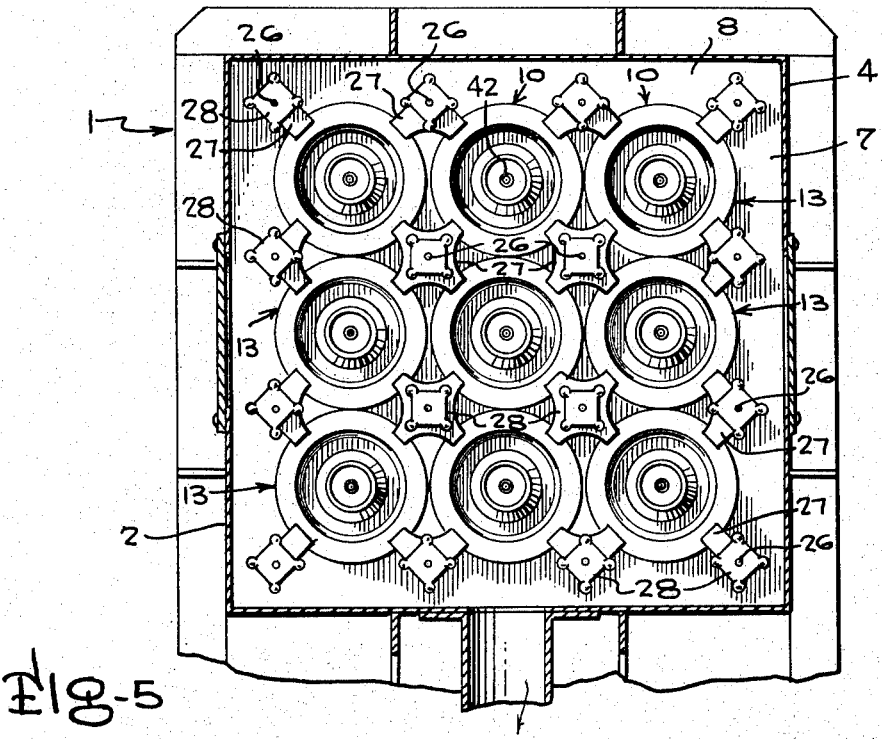
FIGURE 5 is a detail section, viewing several of the filters in end elevation, taken on the line 5—5 of FIGURE 1.

Referring to the drawings in detail, there is shown a filter collector 1 which includes a housing 2 supported upon legs 3. The housing can take any appropriate shape, and is shown as having a rectangular upper section 4 enclosing a filter chamber 5. The housing sides converge downwardly below the upper section, forming a dust, or filtered material, discharge hopper 6.

The upper section 4 of the housing is offset forwardly at its upper part to form a plenum chamber 7. A tube sheet 8 forms a partition between the filter chamber 5 and the plenum chamber 7.

Dust laden air, or other gaseous conveying medium, enters the filter chamber through an inlet 9 which opens into the upper portion of hopper 6. The conveying medium passes through filters 10 mounted on tube sheet 8 and the dust, powder, etc. falls into hopper 6 for discharge. The filtered conveying medium passes from the filters into the plenum chamber 7 and discharges through an outlet 11.

The tube sheet 8 is perforated in any desired pattern to receive a plurality of filters. In the example shown, there are nine openings 12 arranged in a square pattern. It is preferable to have the openings in rows for ease in mounting blow-back tubes, as will be described.

The filters are of the cage type, and each consists of an open cage end 13, a cage frame 14 and a sock 15. The open cage end is a tubular member, having an inner ring 16 with a flat face to which the longitudinal rods 17 of the frame are attached. An annular flange 18 projects outwardly about the ring to seat upon the tube sheet 8 about the opening 12 in which the filter is placed. A circular gasket 19 is interposed between the flange and the tube sheet to provide a seal. The cage end projects outwardly beyond the ring and flange forming an outlet nozzle 20 which is open centrally to provide an air outlet from the cage to the plenum chamber. Opening 21 in the nozzle converges outwardly to cause an increase in speed in the outflowing air.

The cage frame is composed of the longitudinal rods 17 arranged in spaced relation in a circular pattern, annular end members 22 to which the rods 17 are connected, and suitable intermediate supporting rings 23. The several elements are permanently connected to form a skelton cage frame and attached to the ring member 16 of the cage end 13.

Filter sock 14 is a simple tubular member of suitable filter material, having a closed end 24. The open end of the sock is slipped over the cage and drawn up to bring the closed end 24 against the frame end. The open end of the sock will be encircling the ring member 16 of the cage end, and is removably fixed to that member by a clamp 25.

The filters are freely insertable from the plenum chamber through the openings 12 in the tube sheet, and will be inserted so that the gaskets 19 abut the tube sheet about the openings 12. Studs 26 are attached to the front of the tube sheet at points spaced from the openings and outside the area occupied by the filter end member flanges 18. These can be arranged in any desired pattern. The studs are shown at the centers of each of the groups of four filters and around the outer edges of the outer perimetric row of the bank of filters. Suitable clamping members 27 are placed on the studs to bear against the filter end member flanges and hand knobs 28 are threaded on the studs to cause the clamping members to clamp the filters to the tube sheet. The removal of the knobs and underlying clamps about a selected filter will release that filter for removal from the collector.

In order to provide access to the filters, the outer wall of the plenum chamber is formed by a door 29, hinged at 30 along one side of the upper rectangular section 4 of the housing. Along the inner surface of the front vertical edges of the side walls of the housing for the depth of the plenum chamber, there are channels 31 and 32, welded along one edge to the housing walls with their flanges extending outwardly. Similar channels 33 and 34 are mounted at the top and bottom of the plenum chamber. The combined channels form a perimetric trough 35 about the plenum chamber in which a sealing gasket 36 is seated. Door 29 has an inwardly extending perimetric flange 37 which enters the trough when the door is closed and presses in sealing engagement upon the gasket 36. The door is held in closed position by means of suitable hold-down devices 38. These may consist of threaded studs 39, mounted in the channels about the plenum chamber to project through openings in brackets 40 fixed to the door. Threaded knobs 41 are screwed onto the projecting ends of studs 39 to press the door tightly against the gasket.

In filters of the type under consideration, there are blow-back tubes 42 which enter the ends of the openings 21 through nozzles 20 to emit periodic bursts of air to shake the filter socks and dislodge material caked on the filter. In order to remove the tubes from their operative positions wherein they obstruct the removal of the filters, the tubes are mounted on manifolds 43 extending parallel to the door 29 and carried by the door so as to move with it. Manifolds 43 have their inlet ends 44 extending through the door and welded in place. A primary manifold 45 lies vertically of the door on the outside, in line with the projecting inlet ends of manifolds 43. Connections 46 from the primary manifold to the manifolds 43 may include solenoid operated valves 47 for controlling the blow-back air. The primary manifold is connected by a flexible hose 48 to a suitable source of air under pressure.

With the above described arrangement, it is only necessary to release the door by loosening the hold-down devices 38 and to swing the door to its open position to remove all obstruction to removal of the filters. If selected ones of the filters are to be removed, the knobs 28 and clamping members 27 holding those filters can be removed and the filters are free to be withdrawn. When all filters are in place, the door can be closed and secured and the blow-back tubes will be properly positioned in the nozzle ends. The filters will be sealed against the tube sheet and the plenum chamber will be sealed against air leaks. The unit is again ready for use.

While in the above one practical embodiment of the invention has been discolsed, it will be understood that the detailed structure shown and described is merely by way of example, and the invention may take other forms within the scope of the appended claims.

What is claimed is:

1. A filter assembly comprising: a plurality of filter elements each having a horizontally extending longitudinal axis; a housing within which there is a filtering chamber and a plenum chamber sealingly separated by a planar tube sheet oriented in a generally vertically extending plane and having a plurality of filter receiving apertures; each of said filter elements being received and supported in a respective one of said apertures; an inlet in the filtering chamber for entry of gas to be filtered and an outlet in the plenum chamber for removal of filtered gas from the plenum chamber, each filter element comprising a tubular cage frame attached to a ring having an annular flange of larger diameter than the apertures in the tube sheet and an encasing tubular sock fitted over the cage frame and having a closed end and an open end, each filter element being insertable horizontally through a respective aperture in the tube sheet from the plenum chamber and positioned with said tubular sock completely within the confines of the filtering chamber, the annular flange engaging the plenum side of the planar tube sheet; a vertically extending substantially planar door covering an access opening in a vertically extending side wall of said plenum chamber and confronting the tube sheet, a hinge attached to said door and said housing and hingedly mounting the door to the housing for swinging movement between open and closed positions; a manifold rigidly mounted on the door and inside the plenum chamber; a plurality of blow back tubes attached to and fixedly communicating with the manifold; each tube being in axial alignment with the open end and longitudinal axis of a respective one of said filter elements when the door is in closed position; a flexible hose connected to said manifold and adapted to fluidly communicate said manifold with a source of pressurized air; and releasable securing means securing said door in closed position for maintaining said door in closed position.

2. The invention recited in claim 1 additionally including sealing means extending about the periphery of each of said rings and releasable clamping means mounted within said plenum chamber for engaging each of said annular flanges to clamp each of said annular flanges and its respective sealing means to said tube sheet in sealed relationship.

3. The invention recited in claim 2 additionally including sealing means between said plenum chamber and said door for providing a seal between said plenum chamber and said door when said door is in its closed position.

References Cited
UNITED STATES PATENTS

| | | | |
|---|---|---|---|
| 766,495 | 4/1868 | Merrick | 210—462 |
| 1,012,122 | 12/1911 | Budil | 55—341 |
| 1,847,368 | 3/1932 | Wendler | 55—303 X |
| 2,526,651 | 10/1950 | Garbo | 55—303 X |
| 2,533,268 | 12/1950 | Lanter | 55—303 |
| 2,562,699 | 7/1951 | Cooperson et al. | 210—333 X |
| 3,034,652 | 5/1962 | Hobson | 210—459 X |
| 3,169,109 | 2/1965 | Hirs | 210—333 X |
| 3,204,390 | 9/1965 | Heyl | 55—341 |
| 3,234,714 | 2/1966 | Rymer et al. | 55—302 X |

FOREIGN PATENTS

| | | |
|---|---|---|
| 943,527 | 12/1963 | Great Britain. |
| 812,244 | 4/1959 | Great Britain. |
| 914,187 | 12/1962 | Great Britain. |
| 974,144 | 11/1964 | Great Britain. |

HARRY B. THORNTON, *Primary Examiner.*

D. TALBERT, *Assistant Examiner.*